United States Patent [19]
Carver

[11] Patent Number: 5,969,812
[45] Date of Patent: Oct. 19, 1999

[54] SPECTROPHOTOMETER APPARATUS WITH DUAL CONCENTRIC BEAMS AND FIBER OPTIC BEAM SPLITTER

[76] Inventor: David R. Carver, 20145 Hopi Pines Grove, Peyton, Colo. 80831

[21] Appl. No.: 08/545,448

[22] Filed: Oct. 18, 1995

[51] Int. Cl.⁶ ........................................ G01J 3/06
[52] U.S. Cl. ............................................ 356/319
[58] Field of Search ..................... 356/326, 328, 356/319, 320, 402–411, 330–334; 250/227.11, 227.23, 227.24, 226; 385/12, 13

[56] References Cited

U.S. PATENT DOCUMENTS

| | | | |
|---|---|---|---|
| 3,391,600 | 7/1968 | Blumentritt | 356/332 |
| 3,437,411 | 4/1969 | Rudomanski et al. | |
| 3,580,082 | 5/1971 | Strack | 385/12 X |
| 3,614,242 | 10/1971 | Hrdina | |
| 3,885,879 | 5/1975 | Louder et al. | |
| 4,014,612 | 3/1977 | Atwood et al. | |
| 4,125,329 | 11/1978 | French et al. | |
| 4,245,908 | 1/1981 | Gawlick | 356/332 |
| 4,396,288 | 8/1983 | Helphrey | |
| 4,545,680 | 10/1985 | Smith, Jr. | |
| 4,566,792 | 1/1986 | Suzuki | |
| 5,042,893 | 8/1991 | Ong | |
| 5,184,193 | 2/1993 | LeFebre | |
| 5,212,537 | 5/1993 | Birang et al. | |

FOREIGN PATENT DOCUMENTS 46-23651  7/1971  Japan .

OTHER PUBLICATIONS

Design of an LC detector: Part One, by D. Carver et al, Reprinted from *American Laboratory*, May 1987.

*Primary Examiner*—K. P. Hantis
*Attorney, Agent, or Firm*—Timothy J. Martin; Michael R. Henson

[57] ABSTRACT

A spectrophotometer measures optical absorption of light by a sample received in a sample cell. An array of optical elements disperses the light over a spectral pattern, and a fiber optic beam splitter splits light at a selected spectral band into a reference component and a test component. Detectors measure the intensity of the reference component and the test component after the test component passes through the sample. The fiber optic beam splitter includes a plurality of strands arranged with first ends terminating in a common circular area. Opposite ends of peripheral strands are collected into a first set that transmits the test component while the remaining strands for a second set that transmits the reference component. Preferably, there is a single, central, large strand surrounded by smaller strands. Two emitters are provided for light of two different types, such as visible and UV. The optical array forms a collimated beam having an inner core of one type of light and an outer shell of the other. Specially constructed optical elements then reflect and refract the collimated beam. A motor drives a mirror to scan the beam across an optical slit positioned in front of the beam splitter to select a desired spectral band.

22 Claims, 5 Drawing Sheets

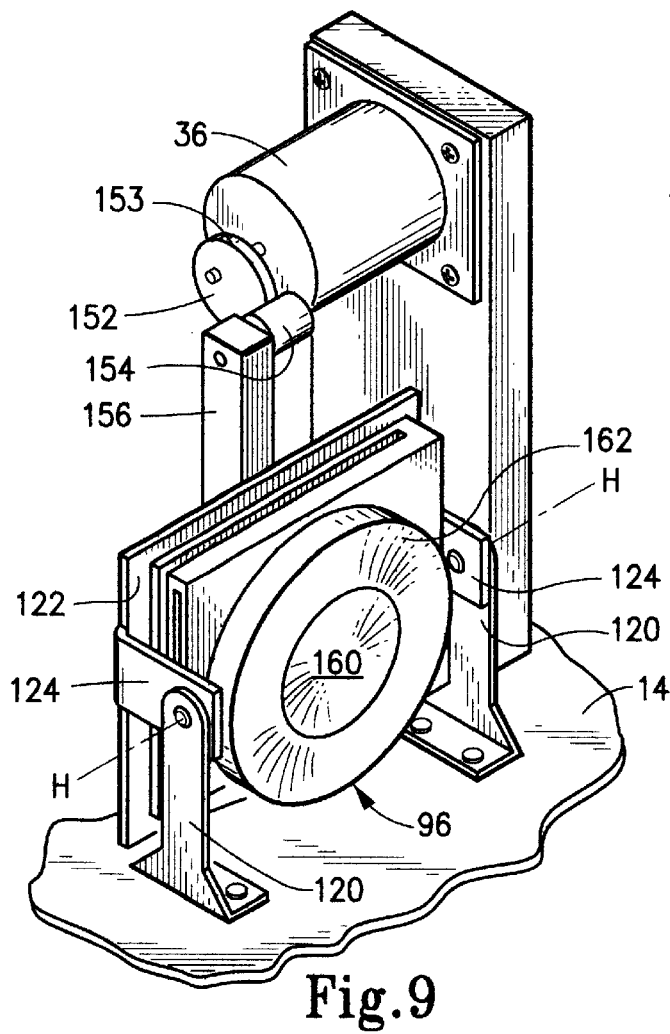
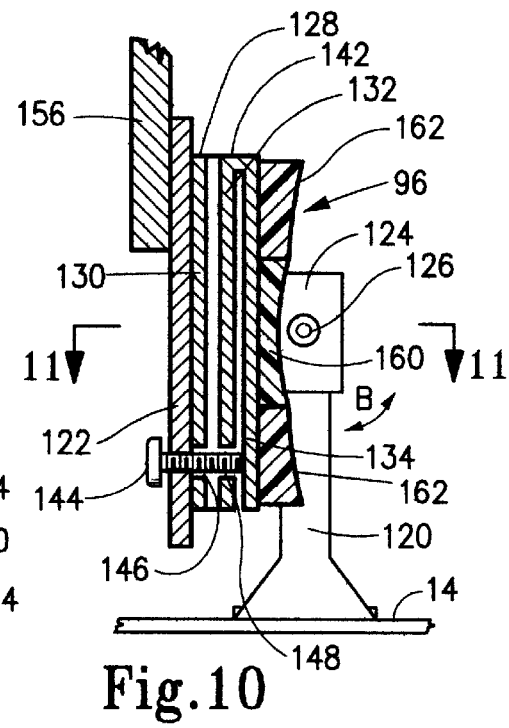
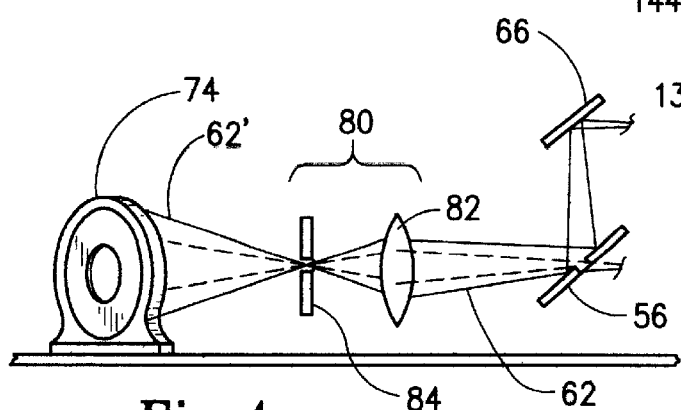
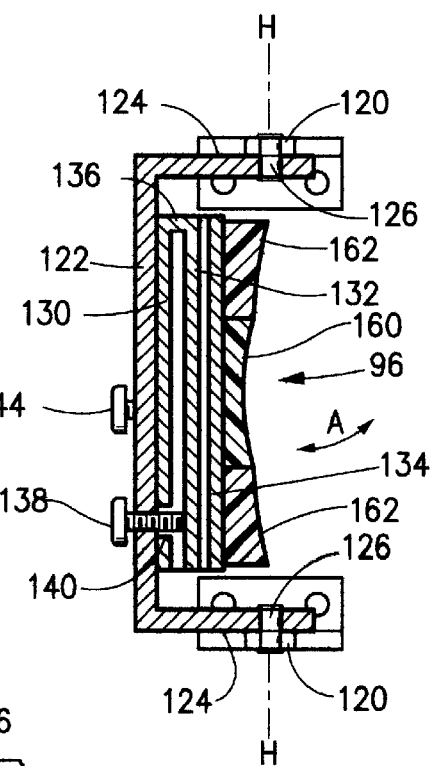
Fig. 9
Fig. 10
Fig. 4
Fig. 11

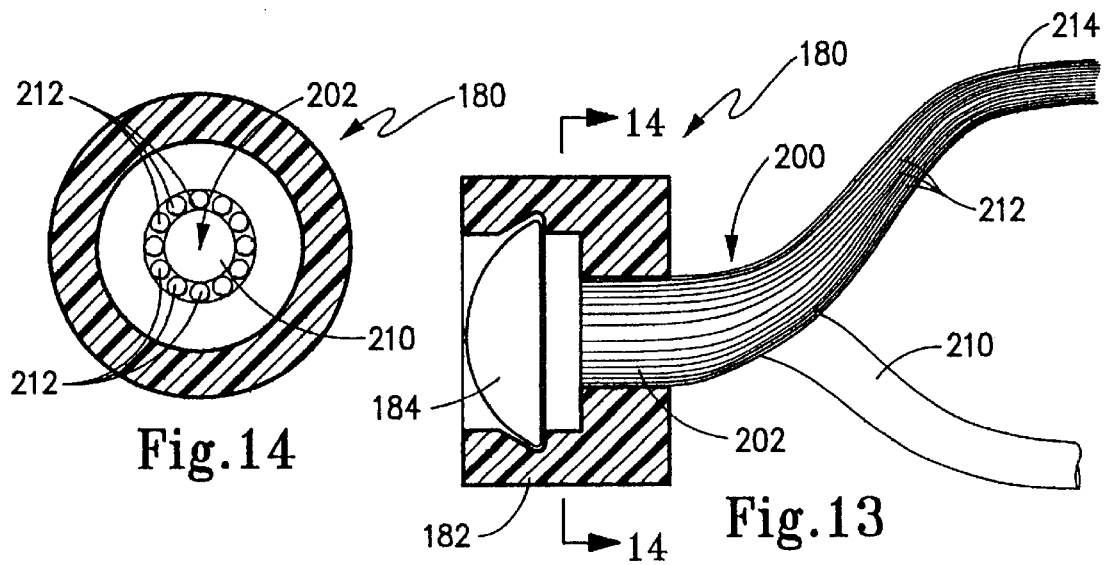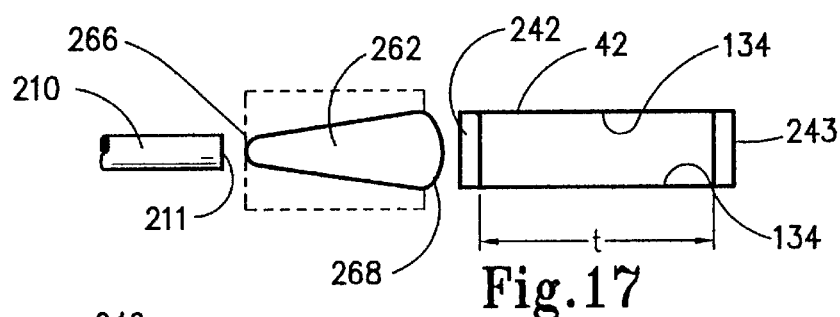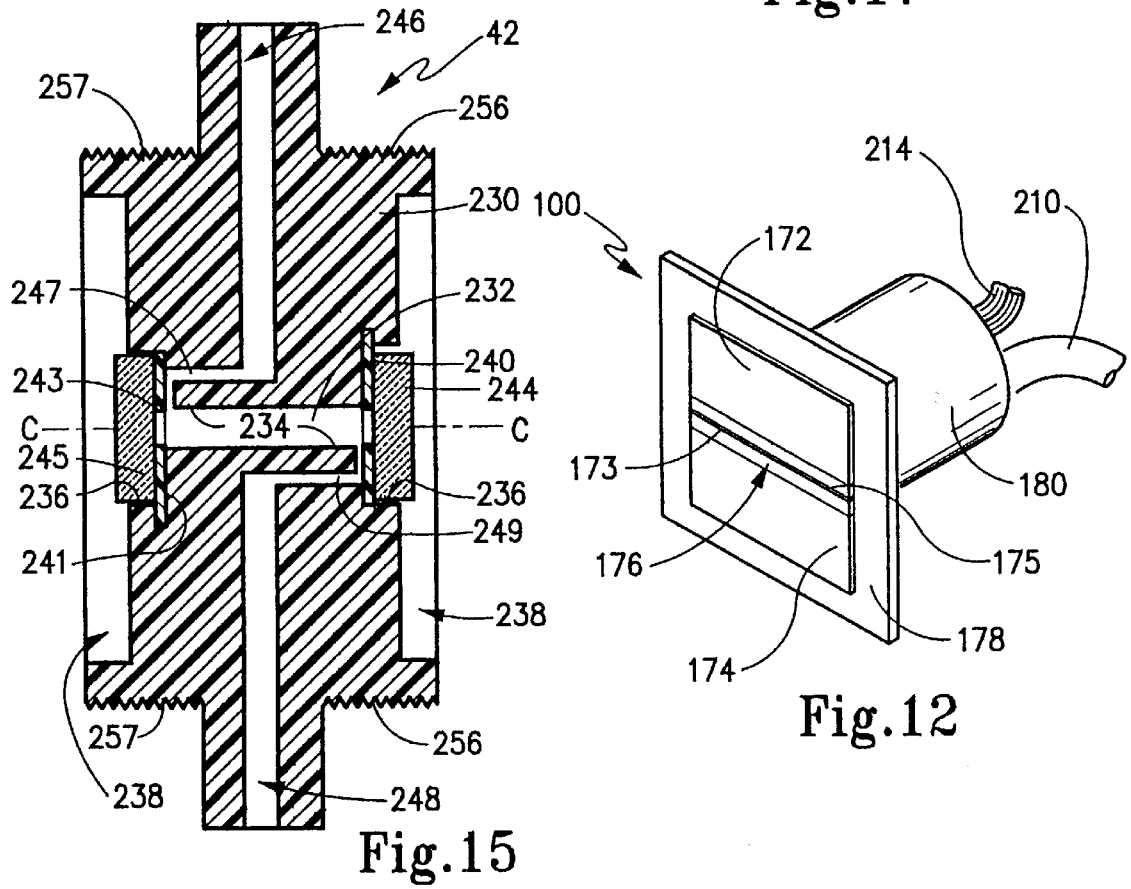

SPECTROPHOTOMETER APPARATUS WITH DUAL CONCENTRIC BEAMS AND FIBER OPTIC BEAM SPLITTER

FIELD OF THE INVENTION

The present invention relates to an apparatus for measuring the optical absorbance properties of a sample material. In particular, the present invention is directed to measuring absorbance of light by a sample material as an analytic tool, such as used in liquid chromatography. Specifically, this invention is concerned with measuring optical absorbance over different wavelengths of light over a wide spectrum, including ultraviolet light as well as the visible.

BACKGROUND OF THE INVENTION

Liquid chromatography has been a steadily growing technology for analytical chemists, and it is generally considered one of the most powerful analytical tools available due to its ability to separate, and thereby differentiate, compounds having minor stoichiometric or isomeric properties. In the field of liquid chromatography, one of the most useful instruments employed to identify sample materials is the spectrophotometer which are also known as photometric absorbance monitors and/or LC detectors. Spectrophotometers help identify compounds by measuring the absorbance by the sample material of light at different wavelengths. By measuring absorbance characteristics over a spectrum of wavelengths, the analysis can create a "fingerprint" of the sample material which may then be used to identify and/or characterize the material.

In order to accurately resolve a test sample compounds "fingerprint", a spectrophotometer must incorporate excellent optics and electronics design. Furthermore, it is desirable to have a spectrophotometer that can produce and monitor spectral absorbance over a wide range of wavelengths and include within that range a substantial portion in the ultraviolet spectrum. Moreover, it is desirable to measure absorbance at relatively narrow bandwidths selected over the wide spectral band. Also, it is desirable that such a spectrophotometer incorporate optics designed to minimize events which may inject error into the absorption measurement.

Prior absorption detectors in the field of liquid chromatography have typically either utilized the light source having a defined wavelength emission or, more preferably, a light source which emits radiation over a wavelength range. The light is then dispersed by means a grading into separate wavelength bands, and these bands are then selectively passed through the sample cell containing the material to be tested. Prior to passing a light beam through the sample cell, a portion of the beam is split to provide a reference to the intensity of the original beam so that this reference may be compared with the beam transmitted through the sample cell to determine the absorption of the selected wavelength of the beam. A discussion of such a detector is described in an article entitled "Design of an LC Detector: Part I", *American Laboratory* (May, 1987) co-authored by the present applicant. Furthermore, such detectors have been sold for a number of years.

In other devices, filters may be used to select a wavelength at which an absorption test is made. An example of such a device is described in one of my copending U.S. application, Ser. No. 08/093,065 filed Jul. 16, 1993 and entitled "Apparatus for Measuring Optical Absorption Properties of a Sample Material". U.S. Pat. No. 3,885,879 issued May 27, 1975 to Louder et al employs a dual beam spectrophotometer utilizing a movable spectral wedge to select a wavelength at which a test is made. The Louder et al reference also employs a bifurcated fiber optic bundle which defines a pickup for the test and reference wavelength band as well as a means for splitting the selected bandwidth between the sample cell and a reference.

A disadvantage of the design of existing spectrophotometers resides in the interaction of the optics with the physical properties of the sample cell. Typically, light is passed through the sample cell in such a manner that it impinges and reflects off of the cell walls before being sensed by the photodetector. Since test materials are typically dissolved in a carrier medium, the physical characteristics attendant the interface between the contact liquid layer and the cell sidewall alters the absorption properties of the cell sidewall so that error is introduced into the intensity measurement. That is, not all absorbance detected results from absorption of light by the test material. This can give a false profile or "fingerprint" of the test material and lead to either incorrect or inconclusive results.

Another disadvantage of many detectors is that the spectral gratings are typically optical elements having sufficient mass so that the inertia present during motion presents difficult mechanical drive problems. That is, it is difficult to start and stop the relatively heavy grating at each of the selected wavelength bands which can effect the resolution of the instrument.

In another of my co-pending U.S. applications, Ser. No. 08/344,209 filed Nov. 23, 1994 and entitled SPECTROPHOTOMETER APPARATUS, I disclose an improved spectrophotometer employing fiber optics to form an optical slit and describing an improved sample cell and focusing structure for the sample material to be tested. This application also discloses an improved arrangement of optical elements and electro-mechanical drives therefor in an effort to increase performance of the spectrophotometer.

Despite the advances evidenced by the above-described technologies, there remains a continuing need for improved spectrophotometer designs which can produce tests results having reduced error. Moreover, there is a continued need for higher resolution apparatus which can accurately and precisely measure optical absorption over a relatively narrow bandwidth. It is a need for such spectrophotometers, of course, to be able to provide measurements over a wide range of available wavelengths while maintaining such narrow bandwidth, especially in wavelengths including the visible, near-infrared and ultraviolet frequencies. A further need exists for simplified construction of such spectrophotometers.

SUMMARY OF THE INVENTION

It is an object of the present invention to provide a new and useful apparatus for measuring optical absorbance properties of a sample material in a sample cell.

Another object of the present invention is to provide a spectrophotometer having improved optical design which is relatively easy and cheap to manufacture.

Another object of the present invention is to provide a spectrophotometer having optical elements which increases the resolution of a test component over a relatively narrow bandwidth for performing an absorbance measurement.

Yet another object of the present invention is to provide an improved optical array through simplified construction and cost thereof.

Still a further object of the present invention is to provide an improved fiber optic beam splitter for use with spectrophotometer, especially as a pickup for a test and reference component of light.

To accomplish these objects, the spectrophotometer apparatus according to the present invention is adapted to measure optical absorption properties of a sample material. In its broad form, the spectrophotometer includes a light source that is operative to produce light at a selected spectrum. Preferably, this light source includes first and second light emitters that produce a light over two different spectra, including visible light and ultraviolet light. In any event, an array of optical elements is provided which is operative to receive a portion of the light from the light source and to disperse this portion of light over a spectral pattern. A fiber optic beam splitter is operative to split the portion of light into a reference component and a test component. This fiber optic beam splitter is preferably formed by a generally circular bundle of strands having first ends terminating in a circular area such that there is a plurality of peripheral strands located along the periphery of the circular area and at least one inner strand that is located centrally of the circular area. Preferably all of the peripheral strands, but at least a majority of them, are separated from the other ones of the strands and are collected into a first set while the other ones of the strands are collected into a second set. The first and second sets split the portion of light into the reference component and the test component. A sample cell is provided which is adapted to receive a sample of the material to be tested. The sample cell is disposed such that the test component of light is transmitted therethrough. A first detector then measures the intensity of the light of the test component after it has passed through the sample cell and a second detector is provided to measure the intensity of light of the reference component. Comparison of these two intensities then leads to a determination of the absorption of the sample material.

In its preferred form, the beam splitter of the present invention includes a single inner strand that is enlarged with respect to the outer peripheral strands. The outer peripheral strands then are bundled into the first set for the reference component while the enlarged inner strand forms the second set. An optical slit is disposed approximately to the beam splitter with the beam splitter being located optically between the optical slit and the sample cell. The optical slit is operative to select the wavelength band at which the optical absorption properties of the sample material are to be measured.

Preferably, the array of optical elements includes a motor driven element that is operative to sweep the spectral pattern across the optical slit so that optical absorption may be measured a different wavelength bands. This motor driven element may be a mirror, and a refracting prism may be disposed proximately to the mirror so that the mirror projects light from the light source through the prism to produce the spectral pattern. In its preferred form, the optical elements include a first array and a second array. The first array of optical elements is operative to collimate portions of the light from the two light emitters comprising the light source into a collimated beam having an inner core comprised of first light and an outer shell comprised of second light. This inner core is initially a conic region with the outer shell being a conic shell that surrounds the inner core. A parabolic mirror may collect this light to form a collimated beam having a cylindrical inner core and a cylindrical shell surrounding the inner core wherein the shell is comprised of second light with the inner core being first light from the first light emitter. If desired, a field stop array may be inserted to enhance resolution of the light sources. Where two light emitters are provided, a first mirror is provided that has an aperture therethrough with this first mirror being oriented such that first light passes therethrough as the inner core while second light is reflected thereby as the outer shell.

These and other objects of the present invention will become more readily appreciated and understood from a consideration of the following detailed description of the exemplary embodiments when taken together with the accompanying drawings, in which:

BRIEF DESCRIPTION OF THE DRAWINGS

FIG. 4 is a diagrammatic side view showing an optional field stop array that may be used to enhance spectral resolution;

FIG. 9 is a perspective view of a second reflecting mirror assembly used with the spectrophotometer apparatus of FIGS. 2 and 3;

FIG. 10 is a side view in cross-section of the reflecting mirror mounting assembly of FIG. 9;

FIG. 11 is a top view in cross-section taken about lines 11—11 of FIG. 10;

FIGS. 12 is a perspective view of the optic slit assembly and beam splitter used with the spectrophotometer apparatus of FIGS. 2 and 3;

FIG. 13 is a side view in partial cross-section and in diagrammatic form showing the beam splitter according to the present invention;

FIGS. 14 is an end view in elevation showing the beam splitter of FIG. 13;

FIG. 15 is a cross-section view of the sample cell according to the exemplary embodiment of the present invention;

FIG. 17 is a side view in elevation, in diagrammatic form, showing the sample cell according to the exemplary embodiment of the present invention.

DETAILED DESCRIPTION OF THE EXEMPLARY EMBODIMENTS

The present invention is directed to spectrophotometer apparatus which may be used as an analytical tool, especially for such applications as liquid chromatography. The spectrophotometer according to the exemplary embodiments of the present invention operates to measure the optical absorption of a sample or test material at a selected wavelength band that is selectable from a relatively wide spectral band. As described below, the spectral band preferably includes wavelengths in both the visible, near infrared and ultraviolet spectra, and measurements may be made at a great variety of narrow band widths within this overall spectral pattern. The present invention is constructed to have relatively simple and precise optical elements to increase the resolution of the device, and the spectrophotometer apparatus incorporates a new fiber optic beam splitter as well as focusing elements which reduce the risk of introducing inaccuracies into the measured absorbance.

Figure 1:
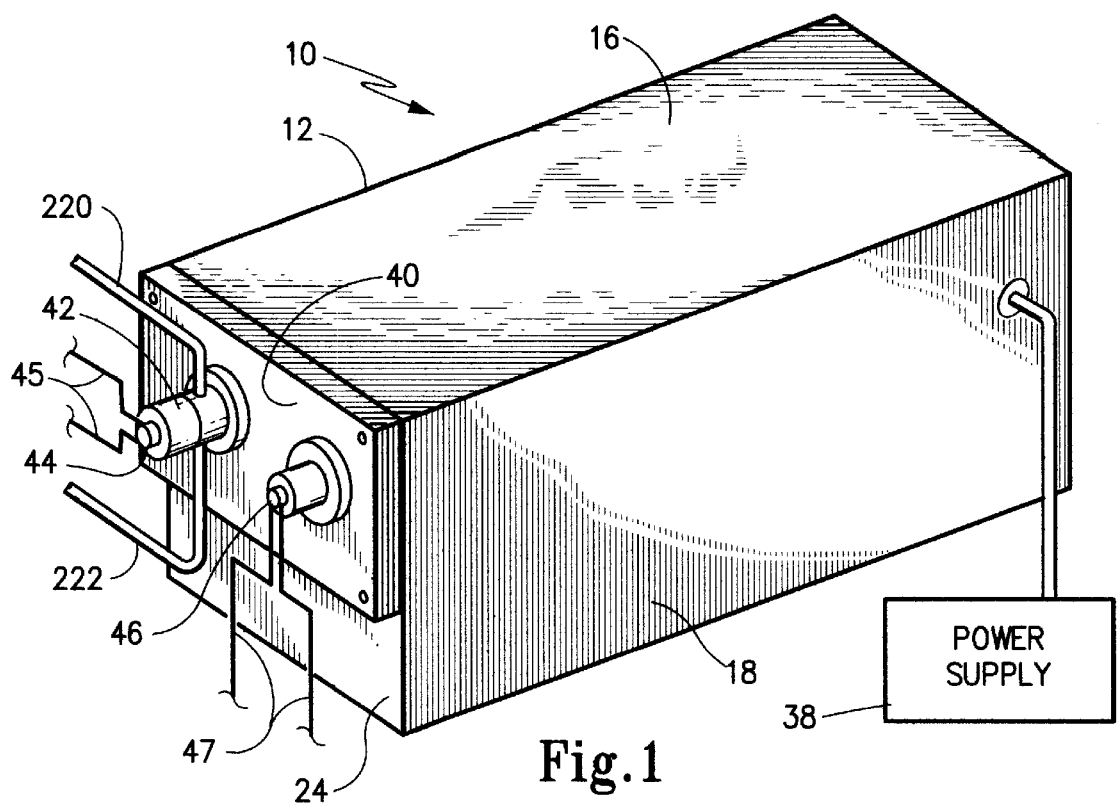
FIG. 1 is a perspective view of a spectrophotometer apparatus according to the exemplary embodiment of the present invention.
Figure 2:
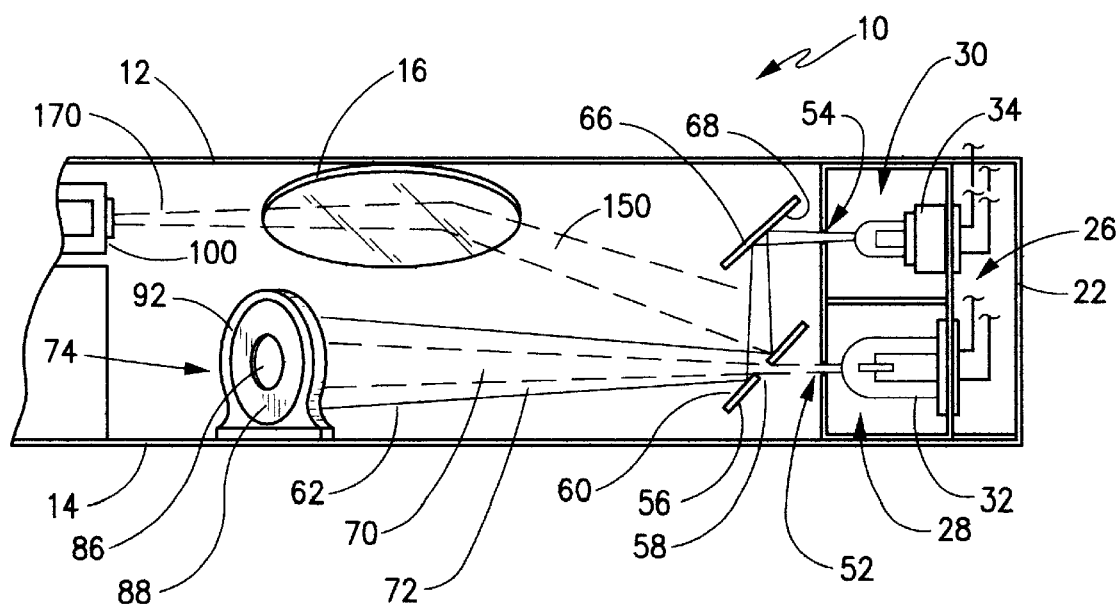
FIG. 2 is a side view of the spectrophotometer apparatus of FIG. 1 showing the optical portion thereof.
Figure 3:
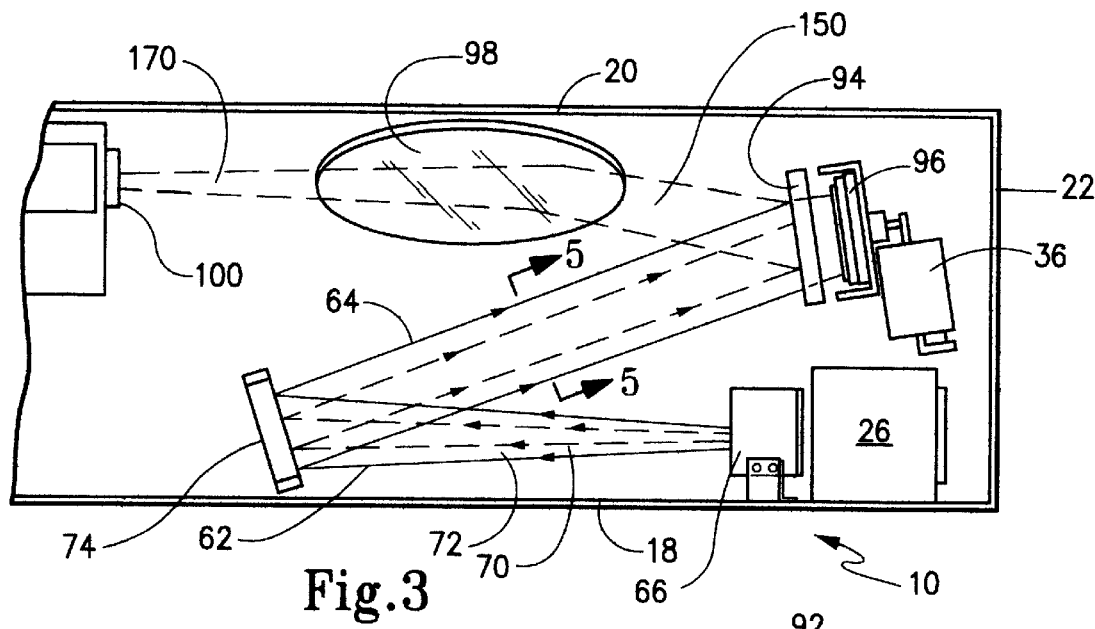
FIG. 3 is a top plan view of the optical system of FIG. 2.

With reference to FIGS. 1–3, it may be seen that the spectrophotometer 10 according to the exemplary embodiment of the present invention includes a housing 12 formed by a bottom wall 14, a top wall 16, sidewalls 18 and 20 and end walls 22 and 24. A dual light source 26 is disposed in housing 12. As is best shown in FIG. 2, dual light source 26 is formed by a separate housing having a first compartment 28 and a second compartment 30 that respectively house a first light source 32 and a second light source 34. First and second light sources 32 and 34 each produce light over different wavelength spectra. For example, first light emitter 32 is preferably a deuterium lamp operative to produce light over an ultraviolet spectrum while second light emitter 34 is a tungsten filament lamp operative to produce over a visible spectrum. As is shown in FIG. 3, a motor 36 is mounted in housing 12 with the function of motor 36 being described in greater detail below. A power supply 38, of any suitable type, is provided to operate light emitters 32 and 34 of light source 26 as well as to provide selective operation of motor 36.

As is also described in greater detail below, but as is shown in FIG. 1, an end plate 40 is mounted on end wall 24, and end plate 40 supports a sample cell 42 as well as its photodetector 44, and a photodetector 46 is also supported on end plate 40. Wire connects 45 are provided for photodetector 44, and, similarly, wire connects 47 are provided for photodetector 46.

Figure 5:
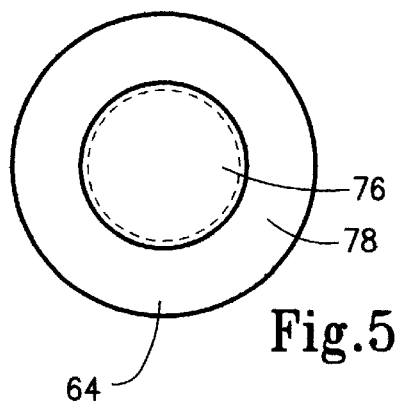
FIG. 5 is a cross-section taken about lines 5—5 of FIG. 3.

With reference to FIGS. 2 and 3, it may be seen that first and second light emitters 32 and 34 are oriented vertically with respect to one another on bottom wall 14 and are operative to produce first and second light, respectively. To this end, dual light source 26 is provided with a first aperture 52 which allows ultraviolet light from first light emitter 32 to exit therefrom. Similarly, a second aperture 54 allows second light from second light emitter 34 to exit therefrom. A first mirror 56 is provided with an aperture 58 which allows a portion of light from first light source 32 to pass therethrough. A second mirror 66 is provided proximate to aperture 54 and includes a mirrored surface 68 which is operative to reflect light downwardly onto mirror 56. Mirrors 56, in turn, has a mirrored surface 60 which reflects a portion of the light from mirror 66 so that a beam of light 62 is formed that has an inner core 70 formed by first light from first light emitter 32 and an outer shell 72 of second light from second light emitter 34. A parabolic mirror assembly 74 is provided to reflect beam 62 as a collimated beam of light 64, as is shown in FIG. 3, so that this collimated beam 64 has an inner core 76 of first light and an outer generally cylindrical shell 78 of second light. Thus, outer shell 78 forms an annular shell that extends around the inner core 76 of first light, as is shown in FIG. 5.

With reference to FIG. 4, it may be seen that an optional field stop array 80 may be interposed in beam 62 in order to enhance resolution of the device. Here, field stop array 80 includes, for example, a lens 82 that is operative to focus beam 62 through an aperture plate 84 to produce a beam 62' that then impinges on parabolic mirror 74. Field stop array 80, as is known in the art, may be used to clean the image of light emitters 32 and 34 in order to create a better spectral band when refracted.

Figure 6:
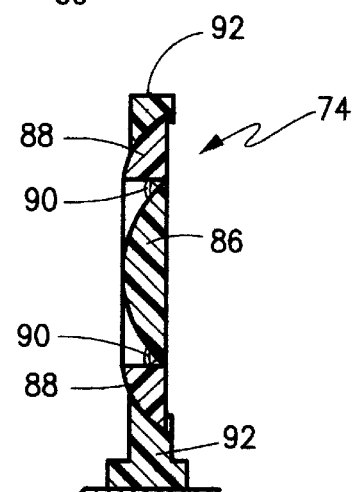
FIG. 6 is a cross-sectional view of a collimating mirror used in the optics shown in FIGS. 2 and 3.

In any event, as is shown in FIG. 6, parabolic mirror 74 includes a first mirror section 86 that is operative to reflect that component of first light forming intercourse 70. An annular second mirror section 88 extends around circular first mirror section 86 and is adhered thereto by means of adhesive 90. Mirror sections 86, 88, after being secured together, are then mounted by means of a bracket support 92 that is mounted on bottom wall 14. Mirror sections 86 and 88 are selected to complement the different spectra of light from emitters 32 and 34.

As is shown in FIG. 3, light beam 64 that is produced by parabolic mirror 74 is directed onto a refracting prism 94 and then onto movable mirror 96, described more thoroughly below. Mirror 96 in turn reflects the light back through refracting prism 94 and onto an oval mirror 98 and then to optical slit assembly 100, described more thoroughly below.

Figure 7:
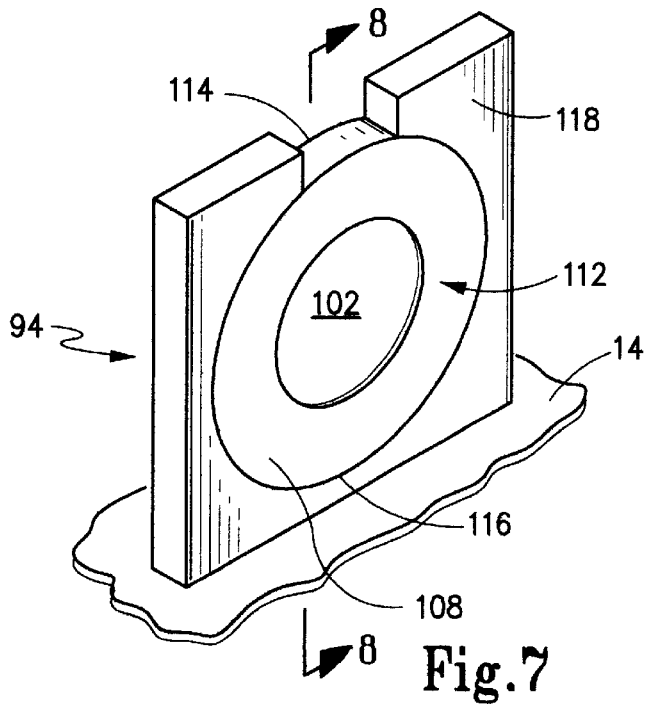
FIG. 7 is a perspective view of the refracting prisms used in the spectrophotometer apparatus of FIGS. 2 and 3.
Figure 8:
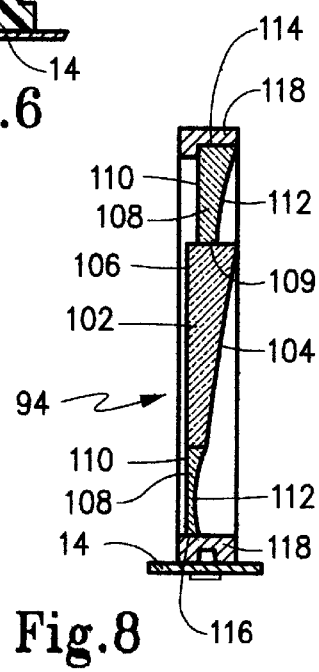
FIG. 8 is a cross-sectional view taken about lines 8—8 of FIG. 7.

Refracting prism 94 is shown in greater detail in FIGS. 7 and 8 where it may be seen that prism 94 includes a circular inner section 102 having a flat front surface 104 that is formed at a small acute angle relative to a flat back surface 106. A second prism section 108 is annular in construction to include an opening 109 sized to fit first prism section 102. Second prism section 108 has a flat back surface 110 and a relatively concave front surface 112, and, as is shown in FIG. 8, prism section 108 diminishes from a top edge 114 to a bottom edge 116. Refracting prism 94, specifically sections 102 and 108 are mounted by means of a support bracket 118 that is disposed in upright manner on bottom wall 114. Prism sections 102 and 108 are selected to complement the different spectra from light emitters 32 and 34.

With reference to FIGS. 9–11, it may be seen that mirror 96, which cooperates with refracting prism 94, is mounted on a pivoting structure which is actuated by means of motor 36. As is seen in these figures, a pair of opposed support brackets 120 are spaced apart from one another and pivotally support a plate 122 which has a pair of spaced apart arms 124 that are rotatably journaled on bearings 126 to support brackets 120. Mirror 96 is secured to plate 122 by means of an adjustable mount 128 that has three plate-like sections 130, 132 and 134. Plate section 130 is mounted, such as by an adhesive, to plate 122 to secure adjustable mount 128 thereon. Intermediate plate section 132 is parallel to plate section 130 but is spaced therefrom a small distance. As is shown in FIG. 11, plate section 132 is connected to plate section 130 by of vertical edge piece 136 which forms a hinge-like connection so that plate 132 may pivot slightly with respect to plate 130. An adjusting screw 138 is threadably received in plate 122 and extends through an opening 140 in plate section 130. Adjusting screw 138 bears against plate section 132 so that rotatable adjustment of screw 138 tilts plate section 132 relative to plate 130 thereby providing adjustment of mirror 96 in the direction of arrow "A". Movement of screw 138 will thereby sweep beam 150 (FIGS. 2 and 3) in a left-to-right direction.

Similarly, plate section 134 is generally parallel to plate section 132 and is connected thereto by means of an edge section 142 that provides a hinge for relative movement of plates 132 and 134. To this end, an adjusting screw 144 is threadable received in plate 122 and extends through openings 146 and 148 in plates 130 and 132, respectively. Screw 144 bears against plate 134 so that rotatable adjustment of screw 144 pivots plate 134 about a horizontal axis thereby adjusting mirror 96 in a direction of arrow "B". This provides a fine tune adjustment for the sweep of beam 150 in the vertical direction.

Adjustable mount 128 can readily be formed out of a common piece of metallic material which is simply sliced by parallel cuts rotated at 90° with respect to one another to leave orthogonal end pieces 136 and 142. In any event, mirror 96 is movable by means of motor 36 which includes a cam 152 mounted on a shaft thereof. A cam follower 154 is disposed at a distal free end of arm 156 which is secured to plate 122, and this assembly is balanced or otherwise biased so that cam follower 154 will track around cam surface 153 of cam 152. Thus, rotation of the shaft of motor 36 causes cam 152 to rotate thereby causing plate 122, and thus mirror 96, to pivot in a horizontal axis "H".

Mirror 96, similar to mirror 74 and prism 94 is formed by an inner circular section 160 surrounded by an annular section 162. These sections are again selected to optically complement the different spectra from light emitters 32 and 34.

With reference again to FIGS. 2 and 3, it may now be appreciated that mirror 96 operates to direct collimated beam 64 toward oval mirror 98 while refracting prism 94 acts to separate beam 64 into a spectral band of variable wavelengths. This spectral band, as exemplified by beam 150 is incident on mirror 98 which is configured so that beam 170 reflected therefrom travels in a generally horizontal path, parallel to bottom wall 14. Moreover, the configuration of oval mirror 98 is selected so that the direction of propagation of beam 170 is generally parallel to side walls 18 and 20. Beam 170, then, is incident on optical slit assembly 100.

Slit assembly 100 is best shown in FIG. 12 where it may be seen that a pair of aperture forming elements 172, 174 have facing edges 173, 175, respectively so that an aperture 176 is formed therebetween. Aperture 176 is preferably one millimeter in height and eight millimeters in width to select a highly resolved spectral band at which optical absorption is to be tested. Thus spectral band, of course, may be selectively varied by the pivotal motion of mirror 96 which acts to sweep the spectral pattern, composed of spectral portions from each light emitter 32 and 34, across the optical slit defined by aperture 176. Elements 172 and 174 are secured to a support plate 178 in any convenient manner such as an adhesive or otherwise.

As is shown in FIG. 12 and, in greater detail, in FIGS. 13 and 14, optical slit 100 is positioned in front of an optical pickup 180 that includes a fiber optic beam splitter 200 that has a first end 202 secured in a mount 182 that also supports a focusing lens 184. Lens 184 is operative to focus a selected spectral band of light from beam 170 onto beam splitter 200. To this end, as is shown in FIGS. 12–14, beam splitter 200 is formed by a central fiber optic strand 210 of relatively large diameter and a plurality of fiber optic strands 212 of smaller diameter. Strands 212 are oriented circumferentially around strand 210 as a bundle to provide peripheral fiber optic strands for fiber optic beam splitter 200 and, is shown in FIG. 14, thirteen such strands are employed. Each of strands 212 is relatively reduced in diameter in comparison with strand 210 and are collected into a bundle 214 as is shown in FIGS. 12 and 13. These strands terminate in a common transverse plane to form a flat face. As described below, light transmitted by fiber optic strand 210 forms a test component of light while light transmitted by fiber optic strands 212 form a reference component of light.

Figure 16:
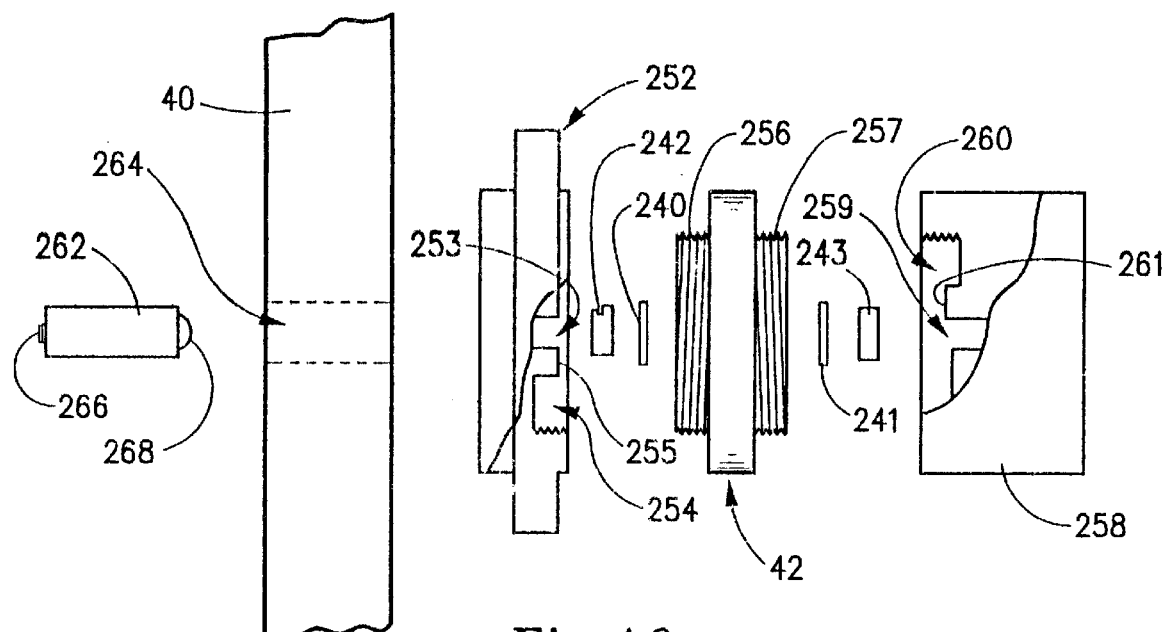
FIG. 16 is an exploded side view, partially broken away, of the sample cell shown in FIG. 15.

It should be understood in reference to FIG. 1 that the reference component of light carried by fiber optic bundle 214 is presented to second photodetector 46 to provide a reference signal. This signal is proportional to the intensity of light in the reference component received and transmitted by strands 212 of beam splitter 200. However, with reference to FIGS. 1 and 17, it should be understood that the test component of light is passed through sample cell 42 and thus through the sample or test material contained therein. The structure of sample cell 42 and its associated components is best shown in FIGS. 15 and 16 where it may be seen that sample cell 42 has a cylindrical main body 230 that has an axial bore 232 oriented along a central axis "C". Bore 232 has a cylindrical surrounding sidewall 234 which forms a chamber for the sample material through which the test component of light is passed. A pair of enlarged seats 236 are axially aligned with one another at opposite ends of bore 232, and seats 236 are located within recesses 238 also axially aligned with one another, which recesses 238 are formed in main body 230. First and second gaskets 240, 242 and first and second transparent windows 244, 245 are seated against seats 236 and thus enclose bore 232 to complete the enclosed chamber for the sample cell. Gaskets 240, 242 have axial holes 241, 243 therethrough to permit passage of light.

In order to introduce a test material into the chamber formed by surrounding sidewall 234, gaskets 240 and windows 242, a pair of radial bores 246 and 248 are formed in main body 230 and respectively form an inlet and outlet for sample cell 42. To this end, radial bore 246 communicates with bore 232 by means of inlet passageway 247 at the second end of bore 246 adjacent second window 245. Similarly, outlet radial bore 248 communicates with a first end of bore 232 adjacent first window 244 by means of an outlet passageway 249. Thus, a fluid sample material may flow through inlet 246, and through passageway 247 after which it flows axially through the sample cell, that is, bore 232. Thereafter, the fluid may exit bore 232 by flowing through passageway 249 and outlet bore 248. Inlet conduit 220 may be connected to inlet bore 246, and outlet conduit 222 may be connected to outlet bore 248, as is shown in FIG. 1. With reference to FIG. 16, it may be seen that sample cell 42 is mounted to end plate 40 by means of an interface plate 252 which has a threaded opening 254 adapted to meet with threads 256 on main body 230. Interface plate 252 has an axial passageway 253 to allow light transmission, and a raised area 255 in opening 254 is provided to abut first window 242 in order to seal it against gasket 240. An interface 258 includes a threaded opening 260 adapted to meet with threads 257 also on main body 230 of sample cell 42. Interface block 258 has an axial passageway 259 to allow light transmission, and a raised area 262 in opening 260 is provided to abut second window 243 in order to seal it against gasket 241. Photodetector 44, in the form of a photocell is then positioned on interface block 258, as is shown in FIG. 1. Electrical signals from detectors 44 and 46 are carried by wires 45 and 47, respectively.

With reference to FIGS. 16 and 17, it may also be seen that an important feature of the present invention is to have a sample cell of length "t" that is approximately one centimeter and to include a lens 262 sized and adapted to fit within a bore 264 formed in second end plate 226 so that lens 262 is axially aligned with central axis "C". Lens 262 has a first end 266 that is in closely-spaced facing relation with second end 211 of the fiber optic strand 210. Lens 262 has a second end 268 which is closely-spaced facing relation to first window 242 associated with sample 42. The test component of light emerging from end 211 preferably has a cone angle less than 25°. Lens 262 is preferably formed of fused silica and is constructed of a length to sufficiently focus the test component at a small cone angle so that, for the length of sample cell 42, the test component does not significantly impinge on the surrounding sidewall 234. This diminishing should accomplish such focusing over all wavelengths in the spectral pattern. Preferably, lens 262 is approximately 12 millimeters in thickness between first end 266 and record end 268, and has an entry diameter of approximately 1.5 millimeter and an exit diameter of approximately 4 millimeters. The radius of curvature at first end 262 is approximately 1 millimeter while the radius of curvature at end 268 is approximately 3 millimeters. In order to make sure that the reference components is also accurate, it should be understood that a lens similar to lens 262 may be interposed between the ends of the fiber optic strands in second bundle 214 and the photodetector 46.

Figure 18:
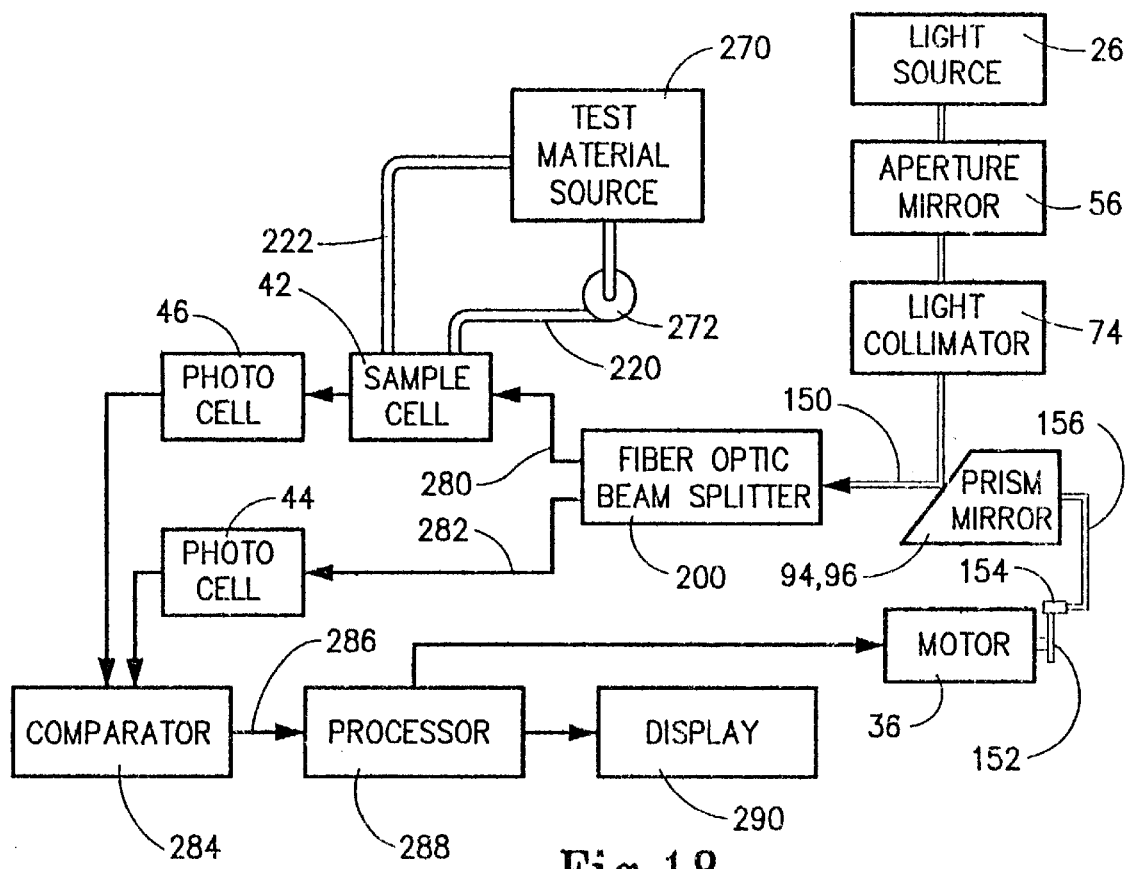
FIG. 18 is a flow chart showing the spectrophotometer according to the present invention.

From the foregoing, and with reference now to FIG. 18, operation of the device may be appreciated in greater detail. In FIG. 18, it may be seen that fluid test material from a test material source 270 is pumped through sample cell 42 by means of a pump 272 connected to inlet conduit 220, with the sample material returning to the test material source by way of outlet conduit 222. Light from light source 26 is incident on a prism and mirror, such as representative prism 94 and mirror 96 where it is dispersed as a beam 150 over the spectral band of the light source. Mirror 94 is driven by means of motor 36, cam 152, cam follower 154 and arm 156 so that fiber optic beam splitter 200 receives a selected narrow bandwidth of beam 150 and splits light from beam 150 into a test component 280 and a reference component 282. Test component 280 is then passed through sample cell 42 where is detected by first photocell detector 44 while reference component 282 is detected by second photocell detector 46. Signals from photocell detectors 44 and 46 are presented to a comparator 284 which then generates a signal, at 286, which may be processed by processor 288 so that the absorption of the sample and sample cell 42 at the selected wavelength bandwidth is displayed on display 290. Display 290 may, for example, be a pen plotter so that a graph of intensity versus wavelength may be automatically written. Processor 288 also controls motor 36 to instructed motor 36 to rotate mirror 96 by any convenient means known in the art.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

I claim:

1. A spectrophotometer apparatus for measuring optical absorption properties of a sample material, comprising:
   (a) a light source operative to produce light over a selected wavelength spectrum;
   (b) an array of optical elements operative to receive a portion of the light from said light source and to disperse said portion over a spectral pattern;
   (c) a fiber optic beam splitter operative to split said portion of light into a reference component and a test component, said fiber optic beam splitter formed by a plurality of fiber optic strands arranged such that first ends thereof terminate in a common circular area with a plurality of peripheral strands located along a periphery of the circular area and at least one inner strand located centrally of the circular area, a majority of said peripheral strands having opposite end portions separated from opposite end portions of other ones of said strands and collected into a first set and the opposite end Portions of other ones of said strands being collected into a second set whereby said first and second sets split said portion of light into the reference component and the test component;
   (d) a sample cell adapted to receive a sample of material to be tested, said sample cell disposed such that the test component is transmitted therethrough;
   (e) a first detector operative to measure intensity of light and disposed to receive the test component after the test component has passed through said sample cell, said first detector operative to produce a first signal corresponding to the intensity of light of the test component; and
   (f) a second detector operative to measure intensity of light and disposed to receive the reference component, said second detector operative to produce a second signal corresponding to the intensity of light of the reference component.

2. A spectrophotometer apparatus according to claim 1 wherein said fiber optic beam splitter includes a single inner strand and a plurality of said peripheral strands arranged circumferentially about said inner strand, said inner strand being enlarged in diameter with respect to said peripheral strands and said peripheral strands being uniformly sized with respect to one another.

3. A spectrophotometer apparatus according to claim 2 wherein all of said peripheral strands form said first set and wherein said single inner strand forms said second set.

4. A spectrophotometer apparatus according to claim 3 wherein said second set is operative to transmit the reference component and wherein said first set is operative to transmit said test component.

5. A spectrophotometer apparatus according to claim 1 wherein said light source includes a first light emitter operative to produce light over a first spectrum and a second light emitter operative to produce light over a second spectrum different from said first spectrum.

6. A spectrophotometer apparatus according to claim 5 wherein one of said first and second spectra is primarily visible light and another is primarily ultraviolet light.

7. A spectrophotometer apparatus according to claim 1 including an optical slit disposed proximately to said fiber optic beam splitter with said beam splitter optically located between said optical slit and said fiber optic sample cell, said optical slit operative to select a wavelength band from said spectral pattern at which wave length band the optical absorption properties of the sample material are to be measured.

8. A spectrophotometer apparatus according to claim 7 wherein said array of optical elements includes a motor-driven element operative to sweep said spectral pattern across said optical slit whereby different wavelength bands made be selected for measuring optical absorption.

9. A spectrophotometer apparatus according to claim 8 wherein said motor-driven element is a mirror and including a refracting prism disposed proximately to said mirror, said mirror operative to project light from said light source through said prism to produce said spectral pattern.

10. In a spectrophotometer apparatus for measuring optical absorption properties of a sample material and including a light source operative to produce light over a selected wavelength spectrum, a sample cell adapted to receive a sample of material to be tested by a test component of light transmitted therethrough, a first detector operative to measure intensity of light and disposed to receive the test component after the test component has passed through said sample cell, said first detector operative to produce a first signal corresponding to the intensity of light of the test component, a second detector adapted to measure intensity of light and disposed to receive a reference component of light, said second detector operative to produce a second signal corresponding to the intensity of light of the reference component, and optical elements operative to select a wavelength band for the test and reference components, the improvement comprising a fiber optic beam splitter operative to split light from said light source into a reference component and a test component, said fiber optic beam splitter formed by a plurality of fiber optic strands arranged such that first ends thereof terminate in a common circular area with a plurality of peripheral strands located along a periphery of the circular area and at east one inner strand located centrally of the circular area, a majority of said peripheral strands having opposite end portions separated from opposite end portions of other ones of said strands and collected into a first set and the opposite end portions of other ones of said strands being collected into a second set whereby said first and second sets split said portion of light into the reference component and the test component.

11. The improvement of claim 10 wherein said fiber optic beam splitter includes a single inner strand and a plurality of uniformly sized peripheral strands arranged circumferentially about said inner strand, said inner strand being enlarged in diameter with respect to said peripheral strands.

12. The improvement of claim 11 wherein all of said peripheral strands form said first set and wherein said single inner strand forms said second set.

13. The improvement of claim 12 wherein said second set is operative to transmit the reference component and wherein said first set is operative to transmit said test component.

14. A spectrophotometer apparatus for measuring optical absorption properties of a sample material, comprising:

(a) a first light emitter operative to produce first light over a selected first wavelength spectrum;

(b) a second light emitter operative to produce second light over a second selected wavelength spectrum different from the first wavelength spectrum;

(c) a first array of optical elements operative to collimate portions of said first and second light into a collimated beam having an inner core comprised of first light and an outer shell comprised of second light, said outer shell surrounding said inner core;

(d) a second array of optical elements operative to receive said collimated beam and to disperse said collimated beam into a spectral pattern;

(e) an optical slit operative to receive spectrally distributed light from said second array to select a wavelength band at which optical absorption is to be measured;

(f) a beam splitter operative to split light passing from said optical slit into a reference component and a test component;

(g) a sample cell adapted to receive a sample of material to be tested, said sample cell disposed such that the test component is transmitted therethrough;

(h) a first detector operative to measure intensity of light and disposed to receive the test component after the test component has passed through said sample cell, said first detector operative to produce a first signal corresponding to the intensity of light of the test component;

(i) a second detector operative to measure intensity of light and disposed to receive the reference component, said second detector operative to produce a second signal corresponding to the intensity of light of the reference component; and (j) a signal comparator operative to compare the first and second signals and to produce output correlated to an amount of light absorbed by the sample material at the selected wavelength band.

15. A spectrophotometer apparatus according to claim 14 wherein said first array of optical elements includes a first mirror having an aperture therethrough an oriented such that first light passes therethrough as said inner core and wherein second light is reflected thereby as said outer shell.

16. A spectrophotometer apparatus according to claim 15 wherein said inner core is conic in shape and wherein said outer shell is a conic shell, and including a second mirror operative to collimate said inner core and said outer shell, said second mirror including a central mirror section and an annular mirror section.

17. A spectrophotometer according to claim 16 wherein said second array of optical elements includes a prism having a first prism section operative to refract said inner core into a first spectral pattern portion and an annular second prism section operative to refract said outer shell into a second spectral pattern position, said first and second spectral pattern portions defining said spectral pattern.

18. A spectrophotometer according to claim 17 wherein said second array of optical elements includes a motor-driven third mirror operative to reflect said inner core and said outer shell through said prism, said third mirror including a third mirror central portion operative to reflect said inner core and a third mirror annular section operative to reflect said outer shell, and including a motor operative to selectively move said third mirror whereby said spectral pattern is swept across said optical slit.

19. A spectrophotometer according to claim 14 wherein said beam splitter is a fiber optic bundle formed by a generally circular bundle of strands having first ends terminating in a circular area such that there a plurality of peripheral strands located along a periphery of the circular area and at least one inner strand located centrally of the circular area, a majority of said peripheral strands being separated from other ones of said strands and collected into a first set bundle and the other ones of said strands being collected into a second set whereby said first and second sets split said portion of light into the reference component and the test component.

20. A spectrophotometer apparatus according to claim 19 wherein said fiber optic beam splitter includes a single inner strand and a plurality of uniformly sized peripheral strands arranged circumferentially about said inner strand, said inner strand being enlarged in diameter with respect to said peripheral strands.

21. A spectrophotometer apparatus according to claim 20 wherein all of said peripheral strands form said first set and wherein said single inner strand forms said second set.

22. A spectrophotometer apparatus according to claim 21 wherein said second set is operative to transmit the reference component and wherein said first set is operative to transmit said test component.

* * * * *